United States Patent
Roth et al.

[11] Patent Number: 5,980,666
[45] Date of Patent: Nov. 9, 1999

[54] PROCESS FOR MANUFACTURING LAMINATED GLASS WINDOW INTENDED FOR AUTOMOBILES AND CAPABLE OF REFLECTING INFRARED RAYS

[75] Inventors: Rainer Roth, Heimbach; Rolf Koette, Alsdorf-Beqau; Gerd Cornils, Merzenich-Girbelsrath; Franz Kraemling, Aachen, all of Germany; Ulrich von Alpen, Eupen, Belgium

[73] Assignee: Saint-Gobain Vitrage, Courbevoie, France

[21] Appl. No.: 08/593,128

[22] Filed: Feb. 1, 1996

[30] Foreign Application Priority Data

Feb. 3, 1995 [DE] Germany .................. 195 03 510

[51] Int. Cl.$^6$ ................................. B32B 31/30
[52] U.S. Cl. ........................... 156/107; 264/261
[58] Field of Search ..................... 156/107, 109; 264/261; 359/360

[56] References Cited

U.S. PATENT DOCUMENTS

| | | | |
|---|---|---|---|
| 1,980,510 | 11/1934 | Watkins ........................... | 156/107 X |
| 3,615,318 | 10/1971 | Jagodzinski ....................... | 65/30.1 |
| 3,673,054 | 6/1972 | Wright et al. ..................... | 156/273.3 X |
| 3,794,809 | 2/1974 | Beck et al. ....................... | 219/203 |
| 4,368,945 | 1/1983 | Fujimori et al. ................... | 359/360 |

*Primary Examiner*—Francis J. Lorin
*Attorney, Agent, or Firm*—Oblon, Spivak, McClelland, Maier & Neustadt, P.C.

[57] ABSTRACT

A process for manufacturing a laminated glass window equipped with sealing at one or more edges, wherein the laminated glass window contains at least two glass sheets and laminated plastic placed between the two glass sheets, wherein the laminated plastic is made of at least one principal carrier sheet, having on at least one side at least one layer that reflects infrared radiation and outer layers made of one or more thermoplastic polymers; the process involving:

a) forming a plate from the laminated plastic, the plate having a geometrical shape substantially the same as the glass sheets, but wherein the plate is shorter, by an offset distance, on each of one or more edges to be sealed;

b) preparing a preliminary laminated sheet by positioning the plate in relation to the glass sheets while respecting the offset distance on each of the one or more edges to be sealed and removing air from between the layers formed by the glass sheets and the plate;

c) filling the interstice of the one or more edges to be sealed by injecting a melted material containing one or more polymers compatible with the one or more thermoplastic polymers of the outer layers of the laminated plastic;

d) fusing the one or more polymers injected into the interstice of the edges with the one or more thermoplastic polymers of the outer layers of the laminated plastic.

13 Claims, 2 Drawing Sheets

PROCESS FOR MANUFACTURING LAMINATED GLASS WINDOW INTENDED FOR AUTOMOBILES AND CAPABLE OF REFLECTING INFRARED RAYS

BACKGROUND OF THE INVENTION

1. Field of the Invention

The present invention relates to a process for manufacturing a laminated glass window, intended, in particular, for automobiles, which reflects infrared radiation and has a layer for sealing the edges.

2. Discussion of the Background

EP-A2-0,391,165 discloses (in connection with U.S. Pat. No. 4,368,945) a process for manufacturing a laminated glass window that reflects infrared radiation, by using multilayer laminated plastic containing a metallic layer responsible for reflecting infrared radiation, as well as a sealing placed on the edges, in order to protect the metallic layer, silver is generally used. As for the metallic layer reflecting infrared radiation. This conventional laminated glass window is manufactured according to the normal process from laminated plastic and the two glass sheets. The laminated plastic extends to the edges of the laminated glass window. The sealing occurs by placing a waterproof adhesive product on the "section" (i.e., the edge) of the permanent laminated glass window. In order to form this adhesive layer for sealing the edges, thermoplastic adhesive material with a base of polybutylene copolymers, glues with a base of fluorine polymers, or glues with a butylene base are used.

This conventional process is well adapted to the manufacturing of stationary automobile windows (i.e., windows that are installed rigidly in the frames that surround them and whose edges are covered because they are inserted in the frames), but it is not always appropriate, for example, for manufacturing retractable side windows. In fact, since the retractable windows are exposed when the window is open, the adhesive materials are not only visible, but they are also subject to mechanical constraints that may cause destruction of the sealing of the edges.

Patent DE-Al 2,344,616 mentions a means that permits joining a carrier sheet, made of polyethylene terephthalate (PET) and equipped with a conducting layer, to two glass sheets, by means of thermoplastic polyvinylbutyral sheets for the manufacturing of windshields equipped with electrical heating and made of laminated plastic. This eliminates the risk of corrosion of the edges, by partially removing, over a width of 3 to 12 mm, the metallic covering present on the PET sheet which extends to the edges of the glass sheets. This partial removal of the layer can take place by means of chemical or mechanical processes. In this area of the edges, in which the layer has been suppressed, the polyvinylbutyral sheet is directly joined to the surface of the PET sheet and thus plays a necessary role in sealing.

It is also well known that it is possible to prevent corrosion of the silver layer by using a carrier sheet equipped with a covering and having dimensions less than those of the glass sheets. This carrier sheet is wrapped between two thermoplastic sheets whose dimensions can correspond to those of the glass sheets. The sheets are brought together so that the edges of the carrier sheet equipped with the covering are recessed at least 3 mm from the edges of the glass sheets (U.S. Pat. No. 3,794,809).

The polymer of the thermoplastic sheets covering the carrier sheet is then crosslinked by means of a thermal, high pressure process so as to ensure the desired sealing.

While the two processes described above are effective, they have several deficiencies. They require the use of carrier sheets equipped with a covering. There must be free access at least to the coated side. The carrier sheets must then receive at least one additional sheet, such as a thermoplastic sheet, for example, made of polyvinylbutyral. But, the carrier sheets equipped with an accessible layer have a significant disadvantage. In fact, the sensitive superficial layer is not protected during handling of the carrier sheet equipped with a covering, so that there is a risk of harming and/or dirtying the superficial layer. Unfortunately, such defects would be visible on the laminated glass window once it was completed.

SUMMARY OF THE INVENTION

Accordingly, one object of the present invention is to provide a process for manufacturing a laminated glass window (or "glazing") that reflects infrared radiation and is equipped with a means for sealing the edges.

A further object of the present invention is to provide a process for the manufacture of a laminated glass window which is suitable for industrial production.

A further object of the present invention is to provide a process for the manufacture of a laminated glass window that permits an effective and durable sealing on the edges of the laminated glass window, and provide a sealing layer that does not cause problems, especially from an optical point of view.

These and other objects of the present invention have been satisfied by the discovery of a process for manufacturing a laminated glass window equipped with sealing at one or more edges, wherein the laminated glass window comprises at least two glass sheets and laminated plastic placed between said at least two glass sheets, wherein the laminated plastic comprises at least one principal carrier sheet, having, on at least one side, at least one layer that reflects infrared radiation, and outer layers comprising one or more thermoplastic polymers; the process comprising:

a) forming a plate from the laminated plastic, said plate having a geometrical shape substantially the same as the glass sheets, but wherein said plate is shorter, by an offset distance, on each of one or more edges to be sealed;

b) preparing a preliminary laminated sheet by positioning said plate in relation to the glass sheets while respecting said offset distance on each of said one or more edges to be sealed and removing air from between the layers formed by the glass sheets and said plate;

c) filling the interstice of the one or more edges to be sealed by injecting a melted material comprising one or more polymers compatible with said one or more thermoplastic polymers of the outer layers of the laminated plastic;

d) fusing the one or more polymers injected into the interstice of the edges with the one or more thermoplastic polymers of the outer layers of the laminated plastic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying Figures, wherein.

DETAILED DESCRIPTION OF THE PREFERRED EMBODIMENTS

Figure 1:
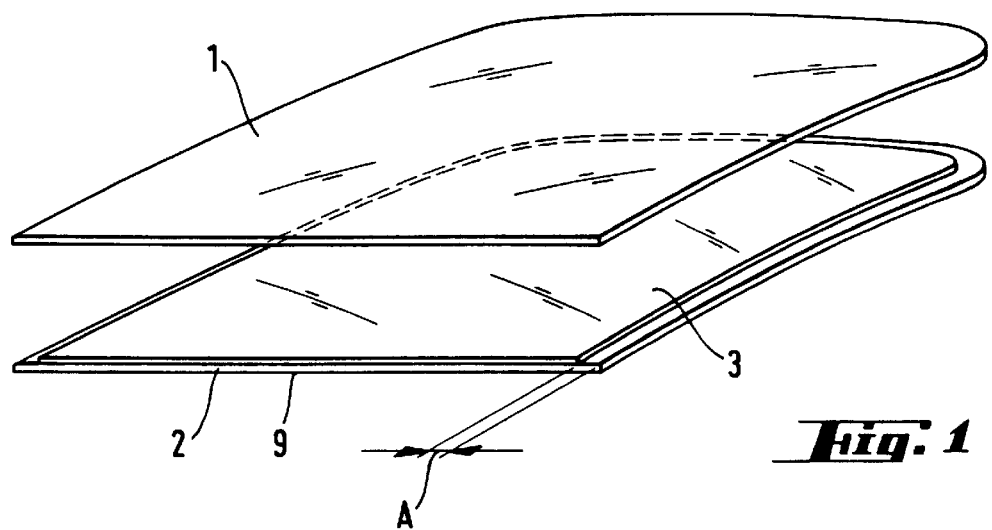
FIG. 1 represents the different layers of a laminated glass window, as they are observed during the process of joining them together.

The process of the present invention uses a laminated plastic that includes a carrier sheet equipped, on at least one of its sides, with at least one layer that reflects infrared radiation. The laminated plastic also includes outer layers with a base of one or more thermoplastic polymers. The process according to the present invention comprises the following steps:

a) forming a plate from a laminated plastic having a geometrical form substantially the same as the glass sheets, but wherein the plate is shorter on each of one or more edges to be sealed by a desired offset distance, preferably from 1–10 mm;

b) preparing a preliminary laminated sheet by positioning the sheet of laminated plastic in relation to the glass sheets while respecting the determined offset at the edges. The preparatory (or "preliminary") laminated sheet is manufactured from all the layers, while pushing out the air between the layers and forming a provisional joining or gluing. This is done by laminating or a low pressure process;

c) filling the interstice (or "slit" or "groove") of the edges remaining on the preliminary laminated sheet by injecting a melted material comprising one or more polymers compatible with the one or more thermoplastic polymers already forming the outer layers of the laminated plastic;

d) fusing the one or more polymers injected into the interstice of the edges with the one or more polymers of the outer layers of the laminated plastic. This preferably takes place by means of an autoclave process that makes use of heat and high pressure. Thus, the laminated glass of the present invention is obtained.

Within the context of the present invention, the expression "one or more polymers compatible with the one or more thermoplastic polymers forming the outer layers", means a polymer or polymers likely to fuse with the one or more thermoplastic polymers of the outer layers, especially polymers of the same base composition as the thermoplastic polymers of the outer layers, which may or may not include several additives, such as, one or more adhesive agent(s). In the simplest embodiment, the composition of the one or more injected polymers is identical to the one or more polymers forming the outer layers.

The present process does not require any special safety measures to protect the superficial layer during the manufacturing of the laminated glass window, because this superficial layer is totally covered by the outer thermoplastic layer. Moreover, the sealing of the edges of the laminated glass window is practically invisible. Preferably, the waterproof adhesive product used for sealing has the same appearance and the same index of refraction as the nearby thermoplastic layers and completely blends with these layers, without showing any visible separation line.

If the appearance of the laminated glass window manufactured according to the present invention corresponds to that of a plate of the same type designed in conformity with the process described in patent U.S. Pat. No. 3,794,809, the present process offers a definite advantage to industrial production. In fact, the sensitive superficial layer is covered and only a single sheet, namely the laminated plastic that has already been manufactured, is necessary during the process of creating the laminated glass.

The sealing process can be easily automated by using conventional processes, as will be illustrated below by examples.

Commercially available thermoplastic polyurethanes used to manufacture laminated glass are examples of suitable thermoplastic polymers adapted for producing outer layers of laminated plastic and for injection into the interstice of the edges. For example, they can be used to join polycarbonate plates or sheets to glass sheets.

While a variety of other thermoplastics can also be used, polyvinylbutyral is preferred in the present invention for economic reasons. It is widely used to shape intermediate thermoplastic layer(s) during the manufacturing of laminated glass. Polyvinylbutyral can be easily melted in order to inject it into the interstice of the edges. In this embodiment, it is necessary to be sure that the temperature is not allowed to exceed 230° C. during heating and injection, in order to prevent or minimize discoloration of the polymer by penetration of air or oxygen into the melted polyvinylbutyral.

The composition of polyvinylbutyral that is conventionally used to manufacture laminated plastic is such that adhesion to glass does not exceed a certain ceiling. In fact, conventionally if the adhesion becomes too strong, safety characteristics of the laminated glass window deteriorate. On the one hand, since this factor does not play a role near the edges of the laminated glass window, and, on the other hand, since it may be advantageous for the polyvinylbutyral to correctly adhere on the glass, in order to permit an especially effective sealing near the interstice of the edges, it is possible, as one embodiment of the invention, to add an adhesion improving additive, such as a silane, to the one or more thermoplastic polymers chosen for injection into the interstice.

The following description provides an exemplary embodiment of the laminated glass window prepared by the present process.

Figure 2:
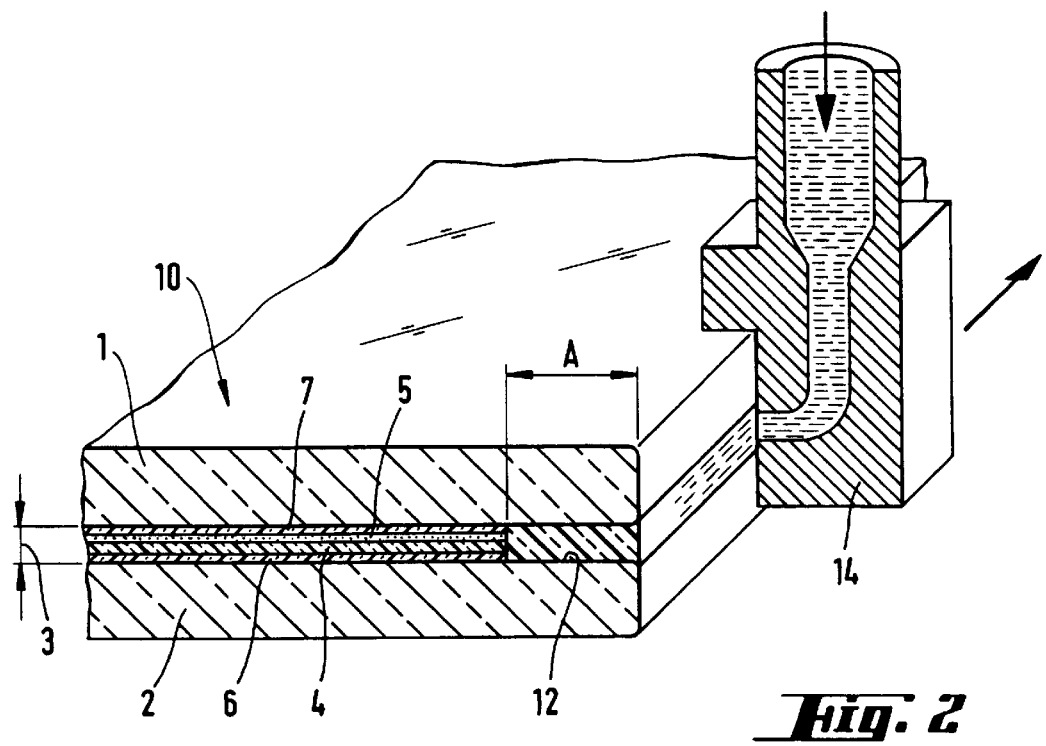
FIG. 2 represents a view of the area of the edges of the preliminary laminated sheet, during injection into the interstice.

The laminated glass window of the present invention is preferably made up of two glass sheets 1 and 2, each with a thickness from 1 to 4 mm. Laminated plastic 3 has been placed between these sheets. This laminated plastic 3, whose structure is represented in FIG. 2, contains a carrier sheet 4, for example made of polyethylene terephthalate (PET), of a thickness between 0.02 and 0.1 mm. This carrier sheet is equipped on one of its sides with a superficial layer 5 capable of reflecting heat. The laminated plastic also contains two outer layers 6 and 7, for example made of polyvinylbutyral, and each layer has a thickness of approximately 0.4 mm. Superficial layer 5, which can reflect heat, may have several sublayers. The actual useful layer may, for example, be made of silver, with a thickness of approximately 8 to 15 nm. It is covered on both sides by other layers that are generally made of metals and/or alloys or a combination of metals. Instead of a single silver layer, layer 5 can contain two and, if necessary, even more than two proportionally thinner silver layers that should be separated from each other by dielectric layers of metallic alloys.

The structure of the laminated plastic can also be designed so that a PET sheet equipped with a covering can be joined to another similar PET sheet that does not have a covering on the side for covering. This is done by means of an adhesive layer. The bonding thus obtained has on both sides an outer layer made of a thermoplastic polymer, for example polyvinylbutyral.

It was for this purpose that suitable laminated plastics were described in patents U.S. Pat. No. 4,368,945, EP 0,303,586, and EP 0,303,587, the appropriate portions of which are hereby incorporated by reference. Laminated plastic of this type is manufactured in the form of strips or bands of sheets, according to a well-known process. It is supplied in reels.

As can be seen in FIG. 1, even before they are joined together, glass sheets 1 and 2 already have their definitive form and size, since that is necessary and customary in producing laminated glass. When one wishes to produce laminated and curved glass, these two sheets 1 and 2 are themselves curved and, if necessary, more or less tempered, so that they receive a stronger mechanical resistance and/or the characteristics of safety glass.

Form 3 is cut out from the existing laminated plastic, following the contours of glass sheets 1 and 2. The contours of the edges to receive the sealing are shorter by a few millimeters than those of the two glass sheets, so that the edge of form 3 is recessed by a distance A in relation to the edges of sheets 1 and 2 (see FIG. 2). This width A will preferably be between 3 and 6 mm. Since the laminated glass window represented here is a retractable side window whose lower edge is hidden and inserted in the door, it is not necessary to seal corresponding lower edge 9 of the laminated plastic window, so that in this zone, plate 3 of the laminated plastic can join the edges of sheets 1 and 2.

Glass sheets 1, 2 and form cut from laminated plastic 3, are joined together in the desired order in a set of layers, as shown in FIG. 1.

A preliminary laminated sheet is then manufactured from this set of layers, as is usually done to produce laminated glass. The process for manufacturing this preliminary sheet may include the following steps: the set of layers is raised to a temperature of approximately 80 to 90° C., then laminated by means of two cylinders. The air present between the layers is thus pushed out; permitting a provisional joining (or gluing) of the layers. For manufacturing preliminary laminated plastic one can also use a vacuum process. The air between the layers is sucked out and the provisional joining is thus obtained by heating the set of layers to temperatures up to 70–100° C.

This preliminary sheet 10 has an interstice 12 at its edge. It is into this interstice 12 that melted polyvinylbutyral, to which an adhesive agent is preferably added, is now injected. It may be advisable during this injection to bring the preliminary sheet to a temperature of 70–120° C. For this purpose, it is possible to preheat the preliminary sheet immediately before injection into the interstice, or to inject it directly after the process of preparatory joining, so long as the preliminary sheet has a high temperature. The injection can also take place at the interstice of the edge at room temperature.

This injection into interstice 12 is preferably done automatically with the help of an injection spray tip 14, which is moved along the length of the edge of laminated glass window 10, preferably in an automated fashion, such as by a robot.

Figure 3:
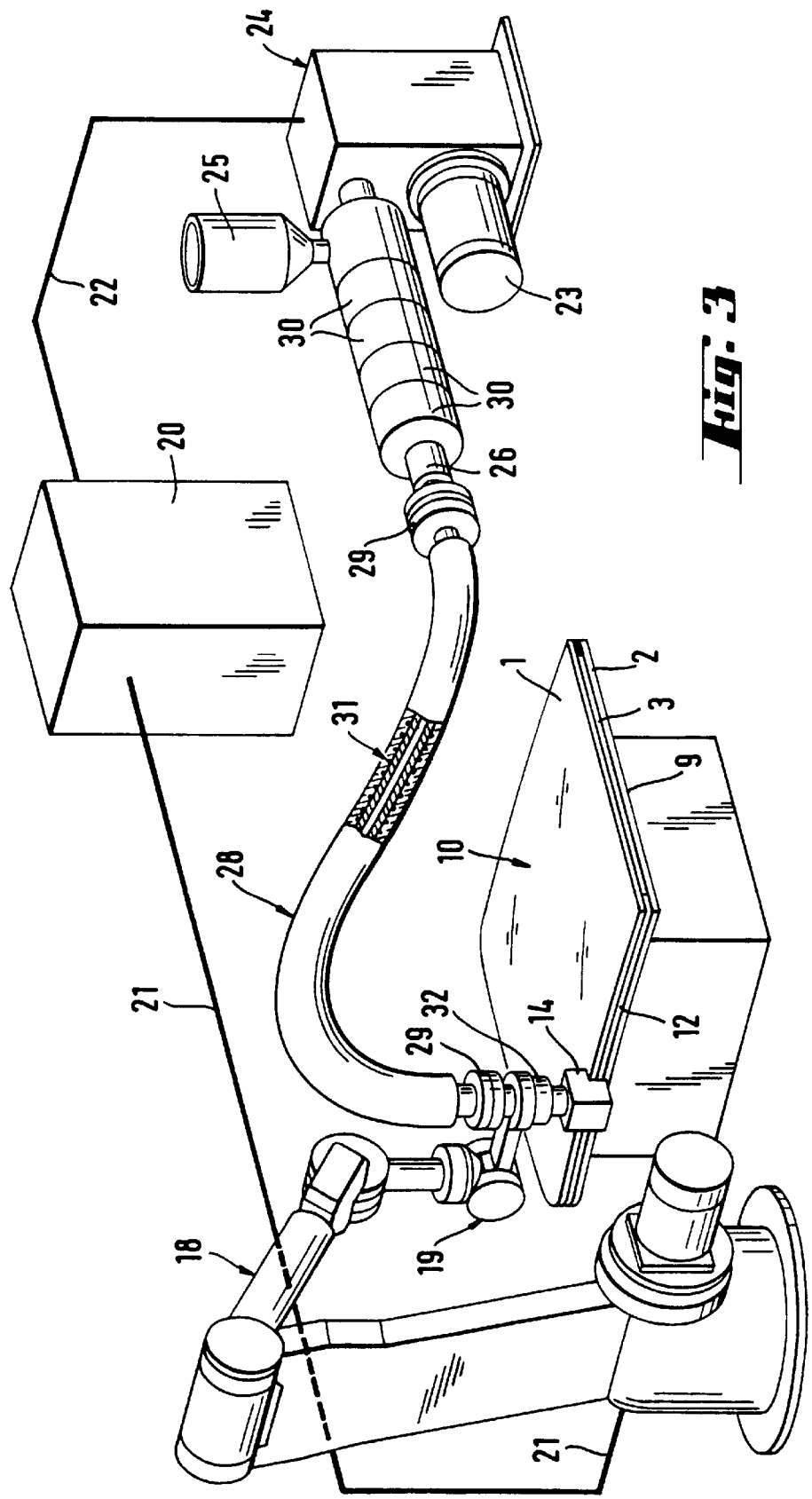
FIG. 3 represents an automatic device that permits injecting material into the interstice.

A device designed for this purpose is represented in FIG. 3.

This device includes a robot 18. Injection spray tip 14 is placed on its manipulating head 19. The injection spray tip 14 is applied against the edge of preliminary sheet 10 by robot 18, which moves it the length of this section while keeping the spray tip in contact with the section. The remote control program of the injection spray tip 14 is stored in the memory of the central control unit 20, which controls the robot 18 via pilot line 21. Likewise, motor 23 of extruder 24 is controlled by central unit 20 via pilot line 22. In extruder 24, polyvinylbutyral pellets, which may, for example, be crushed scraps of standard PVB sheets, are introduced into supply funnel 25. This extruder can be any conventional extruder suitable for use with the chosen thermoplastic. It is preferably equipped with a worm screw. Cylinder 26, which contains the extruder's worm screw, is connected to injection spray tip 14 by a flexible pressure pipe 28, a pivoting joint 29 having been connected to the two extremities of this pipe in order not to apply torque forces to it due to the rotation of injection spray tip 14.

One or more heating rings 30 are present on cylinder 26 of extruder 24. These rings bring the extruder to a desired temperature necessary to melt the thermoplastic, approximately 180° C. in the case of polyvinylbutyral. Likewise, pipe 28 is equipped with one or more resistive heating elements 31, and injection spray tip 14 has a similar resistive element 32. These resistive elements ensure that the thermoplastic is kept at a stable temperature during the entire operation. At this temperature the mass of the melted polymer has a sufficiently low viscosity to allow it to fill interstice 12 completely.

Of course, there are other ways to seal by injection into the interstice, for example with the help of a device that permits the preliminary sheet to move in front of a fixed spray tip, or by means of an injection spray that would be moved by hand the length of the edges of the preliminary sheet.

After having thus filled the interstice with the polymer, such as polyvinylbutyral, the preliminary sheet is subjected to an autoclave process, at a temperature of approximately 140° C. and at a pressure of approximately 10 bar. During this treatment, the polyvinylbutyral injected into the interstice of the edges and the outer layers of the laminated plastic melt together to form a totally homogenous layer that is free of imperfections. The separation line of the carrier layer, equipped with a covering, is certainly still visible, if it is carefully examined under certain lighting conditions, but it is so subtle that it does not at all harm the plate's appearance or optical qualities.

This application is based on German Patent Application 1 95 035 10.0, filed with the German Patent Office on Feb. 3, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for manufacturing a laminated glass window equipped with sealing at one or more edges, wherein the laminated glass window comprises at least two glass sheets, a laminated plastic placed between said at least two glass sheets, the process comprising:
   a) forming a plate from a laminated plastic comprising at least one principal carrier sheet, having, on at least one side, at least one layer that reflects infrared radiation, and outer layers comprising one or more thermoplastic polymers, said plate having a geometrical shape substantially the same as the glass sheets, but wherein said plate is shorter, by an offset distance, on each of one or more edges to be sealed;
   b) preparing a preliminary laminated sheet by positioning said plate in relation to the glass sheets while respecting said offset distance of each of said one or more edges to be sealed, removing air from between the layers formed by the glass sheets and said plate and adhering said layers to one another;

c) filling the interstice of the one or more edges to be sealed by injecting a melted material comprising one or more polymers compatible with said one or more thermoplastic polymers of the outer layers of the laminated plastic; and d) fusing the one or more polymers injected into the interstice of the edges with the one or more thermoplastic polymers of the outer layers of the laminated plastic;

wherein the fusing of said one or more polymers injected into the interstice of the edges with the one or more thermoplastic polymers of the outer layers of the laminated plastic effects sealing of the edges of the laminated glass window to exhibit no visible separation line relative to the thermoplastic layers.

2. The process according to claim 1, wherein the outer layers of the laminated plastic comprise thermoplastic polyvinylbutyral, and the melted material injected into the interstice of the edges comprises polyvinylbutyral.

3. The process according to claim 2, wherein the melted material injected into the interstice of the edges further comprises an adhesion agent.

4. The process according to claim 1, wherein the preliminary laminated sheet is heated during injection of the melted material into the interstice of the edges.

5. The process according to claim 1, wherein the filling step is performed by a remote control robot equipped with an extrusion spray tip.

6. The process according to claim 1, wherein the filling step is performed by moving the preliminary laminated sheet in front of a fixed extrusion spray tip.

7. The process according to claim 1, wherein said offset distance is from 1–10 mm.

8. The process according to claim 1, wherein said fusing step is performed using an autoclave at a temperature and pressure sufficient to effect fusion.

9. The process according to claim 2, wherein said polyvinylbutyral used as the melted material is maintained at a temperature sufficient to effect injection but less than 230° C.

10. The process according to claim 1, wherein said preliminary laminated sheet is prepared by heating the layers formed by the glass sheets and the laminated plastic to approximately 80–90° C. and laminating the layers by compression between two cylinders.

11. The process according to claim 1, wherein said preliminary laminated sheet is prepared by submitting the layers formed by the glass sheets and the laminated plastic to a vacuum to remove air trapped between the layers and heating the layers to a temperature of from 70–100° C.

12. The process according to claim 1, wherein said filling step is performed by heating the preliminary laminated sheet to a temperature of from 70–120° C. prior to injection of said melted material.

13. The process according to claim 8, wherein said fusion is performed at a temperature of approximately 140° C. and at a pressure of approximately 10 bar.

* * * * *

UNITED STATES PATENT AND TRADEMARK OFFICE
CERTIFICATE OF CORRECTION

PATENT NO. : 5,980,666
DATED : NOVEMBER 9, 1999
INVENTOR(S) : RAINER ROTH ET AL

It is certified that error appears in the above-identified patent and that said Letters Patent is hereby corrected as shown below:

On the title page, delete Item "[75] Inventors: Rainer Roth, Heimbach, Rolf Koette, Alsdort-Beqau: Gerd Cornils, Merzenich-Girbelsrath; Franz Kraemling, Aachen, all of Germany; Ulrich von Alpen, Eupen, Belgium"

and replace with --[75] Inventors: Rainer Roth, Heimbach; Rolf Koette, Alsdorf-Begau; Gerd Cornils, Merzenich-Girbelsrath; Franz Kraemling, Aachen, all of Germany; Ulrich von Alpen, Eupen, Belgium--

Signed and Sealed this

Twenty-ninth Day of May, 2001

*Attest:*

NICHOLAS P. GODICI

*Attesting Officer*  Acting Director of the United States Patent and Trademark Office